(12) United States Patent
Miyano et al.

(10) Patent No.: US 9,645,347 B2
(45) Date of Patent: May 9, 2017

(54) SPACER FOR LENSES AND PHOTOGRAPHING APPARATUS HAVING THE SAME

(71) Applicant: Samsung Electronics Co., Ltd., Gyeonggi-do (KR)

(72) Inventors: Masaaki Miyano, Gyeonggi-do (KR); Young-ho Yu, Gyeonggi-do (KR); Jung-ho Bae, Gyeonggi-do (KR)

(73) Assignee: Samsung Electronics Co., Ltd., Yeongtong-gu, Suwon-si, Gyeonngi-do (KR)

( * ) Notice: Subject to any disclaimer, the term of this patent is extended or adjusted under 35 U.S.C. 154(b) by 0 days.

(21) Appl. No.: 14/952,260

(22) Filed: Nov. 25, 2015

(65) Prior Publication Data

US 2016/0154199 A1 Jun. 2, 2016

(30) Foreign Application Priority Data

Nov. 27, 2014 (KR) ........................ 10-2014-0167822

(51) Int. Cl.
G02B 7/02 (2006.01)

(52) U.S. Cl.
CPC .............. *G02B 7/021* (2013.01); *G02B 7/026* (2013.01)

(58) Field of Classification Search
CPC .... G02B 27/0018; G02B 5/003; G02B 7/021; G02B 7/026; G02B 7/102; G02B 7/00; G02B 3/00; G02B 23/2476; G02B 23/243; G02B 13/001; G02B 13/004; G02B 7/02; A61B 1/00
USPC .......................................... 359/819
See application file for complete search history.

(56) References Cited

U.S. PATENT DOCUMENTS 7,715,126 B2 * 5/2010 Apel ...................... G02B 7/026
359/819

FOREIGN PATENT DOCUMENTS

JP 7-113936 A 5/1995
JP 2004-287141 A 10/2004

* cited by examiner

*Primary Examiner* — Euncha Cherry
(74) *Attorney, Agent, or Firm* — Cha & Reiter, LLC (57) ABSTRACT

A lens spacer may be configured to maintain a gap between a first lens and a second lens arranged along an optical axis. The lens spacer may include a first film member having a ring shape and may include a plurality of first tabs and a plurality of first recesses disposed between adjacent ones of the first tabs. The first tabs may protrude from an inner circumferential surface of the first film member toward the optical axis. A second film member may have a ring shape and may include a plurality of second tabs and a plurality of second recesses between adjacent ones of the second tabs. The second tabs may protrude from an inner circumferential surface of the second film member toward the optical axis. The first and second film members may be arranged along the optical axis, and the second tabs may overlap respective ones of the first recesses.

20 Claims, 7 Drawing Sheets

SPACER FOR LENSES AND PHOTOGRAPHING APPARATUS HAVING THE SAME

CLAIM OF PRIORITY

This application claims the benefit of Korean Patent Application No. 10-2014-0167822, filed on Nov. 27, 2014, in the Korean Intellectual Property Office, the disclosure of which is incorporated herein in its entirety by reference.

BACKGROUND

1. Technical Field

The present disclosure relates to a spacer for lenses and a photographing apparatus including the spacer.

2. Description of the Related Art

Photographing apparatuses (e.g., cameras) are used to take pictures or capture images of subjects such as people, objects, or landscapes. In photographing apparatuses, image data obtained from light incident on an imaging device may be stored as image files in a storage medium or may be displayed as images on a display unit.

Such photographing apparatuses may include a lens barrel in which a plurality of lenses is included for photographing subjects. Lens spacers may be disposed between the lenses so as to maintain gaps between the lenses.

Different materials or formation methods may be used to manufacture lens spacers according to the gaps between the lenses. For example, block-type lens spacers including a metal or hard material and manufactured through a machining process such as a cutting process may be used to separate lenses by a relatively long distance from each other. On the other hand, film-type lens spacers having a thin film or sheet shape, which may be manufactured through a press forming process, may be used to separate lenses a relatively short distance from each other.

Block-type lens spacers disposed between lenses hardly vary in shape and make line contact with the lenses. On the other hand, film-type lens spacers disposed between lenses are bent according to the shapes of the lenses and make surface contact with the lenses.

Film-type lens spacers may have a flat shape for convenience in manufacturing. However, when a lens spacer having a flat shape is bent while being brought into contact with lenses having a curved shape, the lens spacer may become wrinkled or otherwise bent due to the difference in the shapes of the lens spacer and the lenses. In this case, the distance between the lenses may not be uniformly maintained.

Nothing contained herein is to be construed as an "admission" of prior art. Applicant expressly reserves the right to demonstrate, where appropriate, that the articles and methods referenced herein do not constitute prior art under the applicable statutory provisions.

SUMMARY

A photographing apparatus may include a lens spacer. The lens spacer stably may maintain a gap between lenses and the aesthetic appearance of the lenses. The lens spacer may be configured to be easily manufactured at a low cost. Additional aspects of the present disclosure will be set forth in part in the description which follows and, in part, will be apparent from the description, or may be learned by practice of the presented exemplary embodiments.

According to an aspect of an exemplary embodiment, a lens spacer may be configured to maintain a gap between a first lens and a second lens arranged along an optical axis may include: a first film member having a ring shape. The first film member may include a plurality of first tabs and a plurality of first recesses between the first tabs. The first tabs may protrude from an inner circumferential surface of the first film member toward the optical axis. A second film member may have a ring shape and may include a plurality of second tabs. A plurality of second recesses between the second tabs may protrude from an inner circumferential surface of the second film member toward the optical axis, wherein the first and second film members are arranged along the optical axis, and the second tabs respectively overlap the first recesses.

The second tabs may have a circumferential width greater than a circumferential width of the first recesses. The second tabs may overlap portions of the first tabs and entire regions of the first recesses. The second tabs may have a circumferential width greater than a circumferential width of the second recesses. The first and second film members may have the same shape. The first tabs may have a circumferential width equal to a circumferential width of the second tabs. The first and second film members may have the same thickness. The first and second film members may have the same inner diameter. The first and second tabs may form a closed loop. The sum of a thickness of the first tabs and a thickness of the second tabs may range from about 0.03 mm to about 1.0 mm.

According to an aspect of another exemplary embodiment, a photographing apparatus may include a first lens and a second lens arranged along an optical axis. A lens spacer may be disposed between the first and second lenses, and may be configured to maintain a gap between the first and second lenses. The lens spacer may include a first film member having a ring shape, and may include a plurality of first tabs and a plurality of first recesses between the first tabs. The first tabs may protrude from an inner circumferential surface of the first film member toward the optical axis. A second film member may have a ring shape, and may include a plurality of second tabs and a plurality of second recesses between the second tabs. The second tabs may protrude from an inner circumferential surface of the second film member toward the optical axis. The first and second film members may be arranged along the optical axis. The second tabs may each overlap respective ones of the first recesses.

The second tabs may have a circumferential width that is greater than a circumferential width of the first recesses. The second tabs may overlap portions of the first tabs and entire regions of the first recesses. The second tabs may have a circumferential width greater than a circumferential width of the second recesses. The first and second film members may have the same shape. The first tabs may have a circumferential width that is equal to a circumferential width of the second tabs. The first and second film members may have the same thickness. The first and second film members may have the same inner diameter. The first and second tabs may form a closed loop. The sum of a thickness of the first tabs and a thickness of the second tabs may range from about 0.03 mm to about 1.0 mm.

These and other aspects of the present disclosure are described in more detail with reference to the accompanying drawings.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Exemplary embodiments will now be described with reference to the accompanying drawings. A lens spacer and a photographing apparatus including the lens spacer will now be described according to the exemplary embodiments with reference to the accompanying drawings. In the drawings, like reference numerals or symbols refer to like components or elements having substantially the same function.

It will be understood that although the terms "first" and "second" are used herein to describe various elements, these elements should not be limited by these terms. These terms are only used to distinguish one element from another. For example, within the scope of the present disclosure, a first element may be referred to as a second element, and similarly a second element may be referred to as a first element. As used herein, the term "and/or" includes any and all combinations of one or more of the associated listed items. Expressions such as "at least one of," when preceding a list of elements, modify the entire list of elements and do not modify the individual elements of the list.

In the following description, the technical terms are used only for explaining a specific exemplary embodiment while not limiting the inventive concept. As used herein, the singular forms "a," "an" and "the" are intended to include the plural forms as well, unless the context clearly indicates otherwise. The meaning of 'include' or 'comprise' specifies a property, a fixed number, a step, a process, an element, a component, or a combination thereof but does not exclude other properties, fixed numbers, steps, processes, elements, components, or combinations thereof. In the drawings, like reference numerals denote members having substantially the same function.

Figure 1:
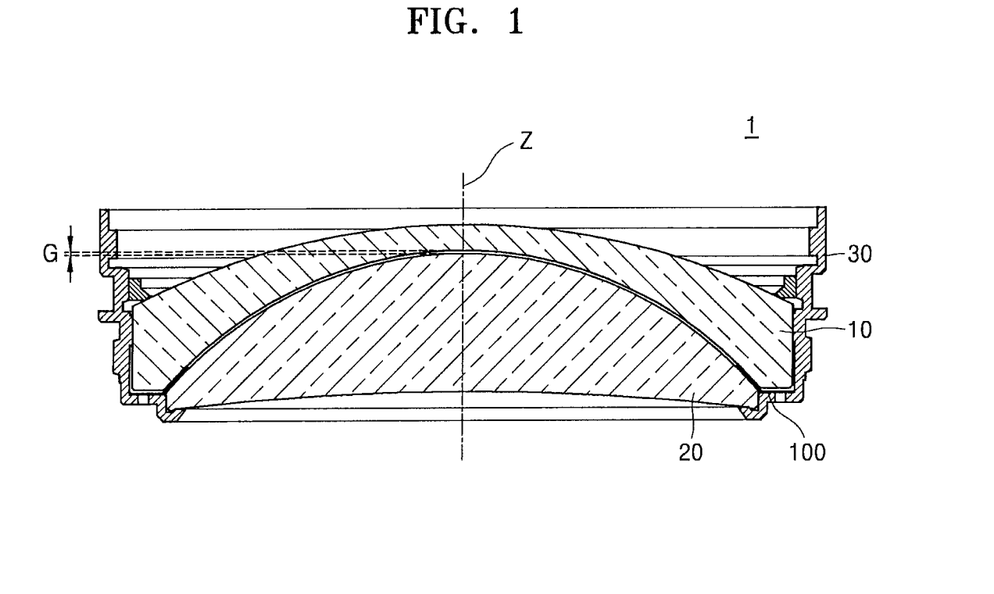
FIG. 1 is a cross-sectional view illustrating a photographing apparatus including a lens spacer according to an exemplary embodiment of the present disclosure.
Figure 2:
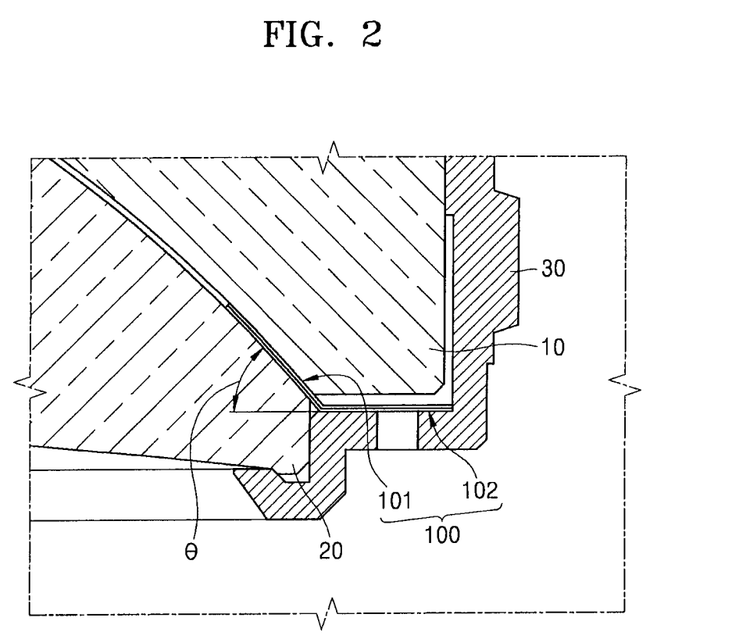
FIG. 2 is an enlarged view illustrating a portion of FIG. 1.

FIG. 1 is a cross-sectional view illustrating a photographing apparatus 1 including a lens spacer 100, according to an exemplary embodiment. FIG. 2 is an enlarged view illustrating a portion of FIG. 1.

Referring to FIGS. 1 and 2, the photographing apparatus 1 of the present exemplary embodiment may be an electronic apparatus such as a camera having a photographing function as the main function thereof. Alternatively, the photographing apparatus 1 may be a module integrated in or detachably attached to a terminal such as a cellular phone, a personal digital assistant (PDA), a laptop computer, or a personal computer (PC), and may have other functions in addition to a photographing function.

The photographing apparatus 1 of the present exemplary embodiment includes a lens barrel 30, and at least two lenses such as first and second lenses 10 and 20 disposed in the lens barrel 30.

The first and second lenses 10 and 20 may be arranged along an optical axis Z. A lower surface of the first lens 10 and an upper surface of the second lens 20 may each have curved shapes. The lower surface of the first lens 10 and the upper surface of the second lens 20 may have corresponding shapes. The lower surface of the first lens 10 and the upper surface of the second lens 20 may have substantially the same radius of curvature.

The lens spacer 100 may be disposed between the first and second lenses 10 and 20. A gap G between the first and second lenses 10 and 20 may be within a range of about 0.03 mm to about 1.0 mm.

The lens spacer 100 is in contact with the first and second lenses 10 and 20 and has a portion 101 that may be bent according to the shapes of the lower surface of the first lens 10 and the upper surface of the second lens 20. Therefore, the portion 101 of the lens spacer 100 may be inclined from a direction perpendicular to the optical axis Z, and another portion 102 of the lens spacer 100 is parallel with the direction perpendicular to the optical axis Z. The portion 101 of the lens spacer 100 may have an inclination angle of about 20° or greater with respect to the direction perpendicular to the optical axis Z.

Figure 3A:
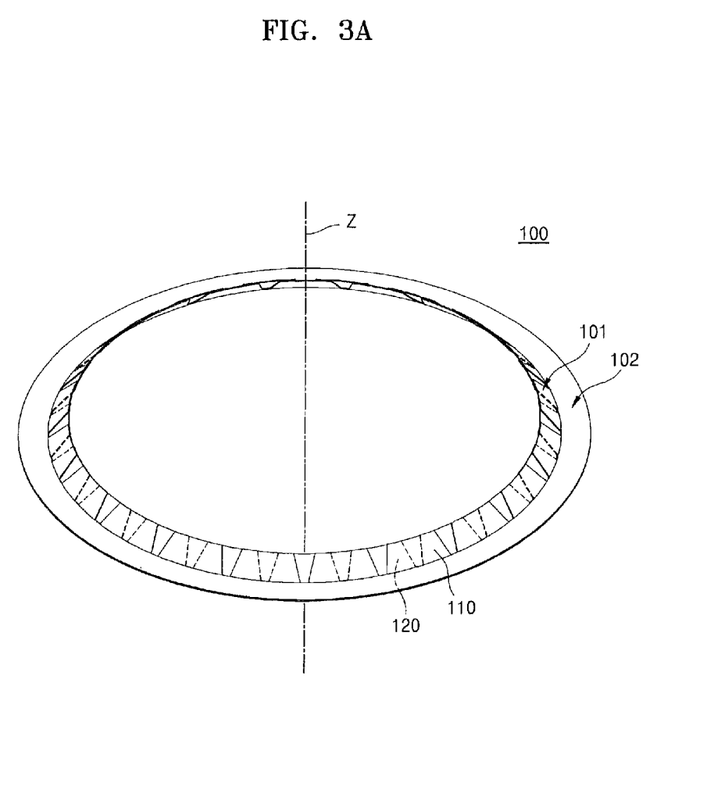
FIG. 3A is a perspective view of the lens spacer of FIG. 1.
Figures 3B, 3C:
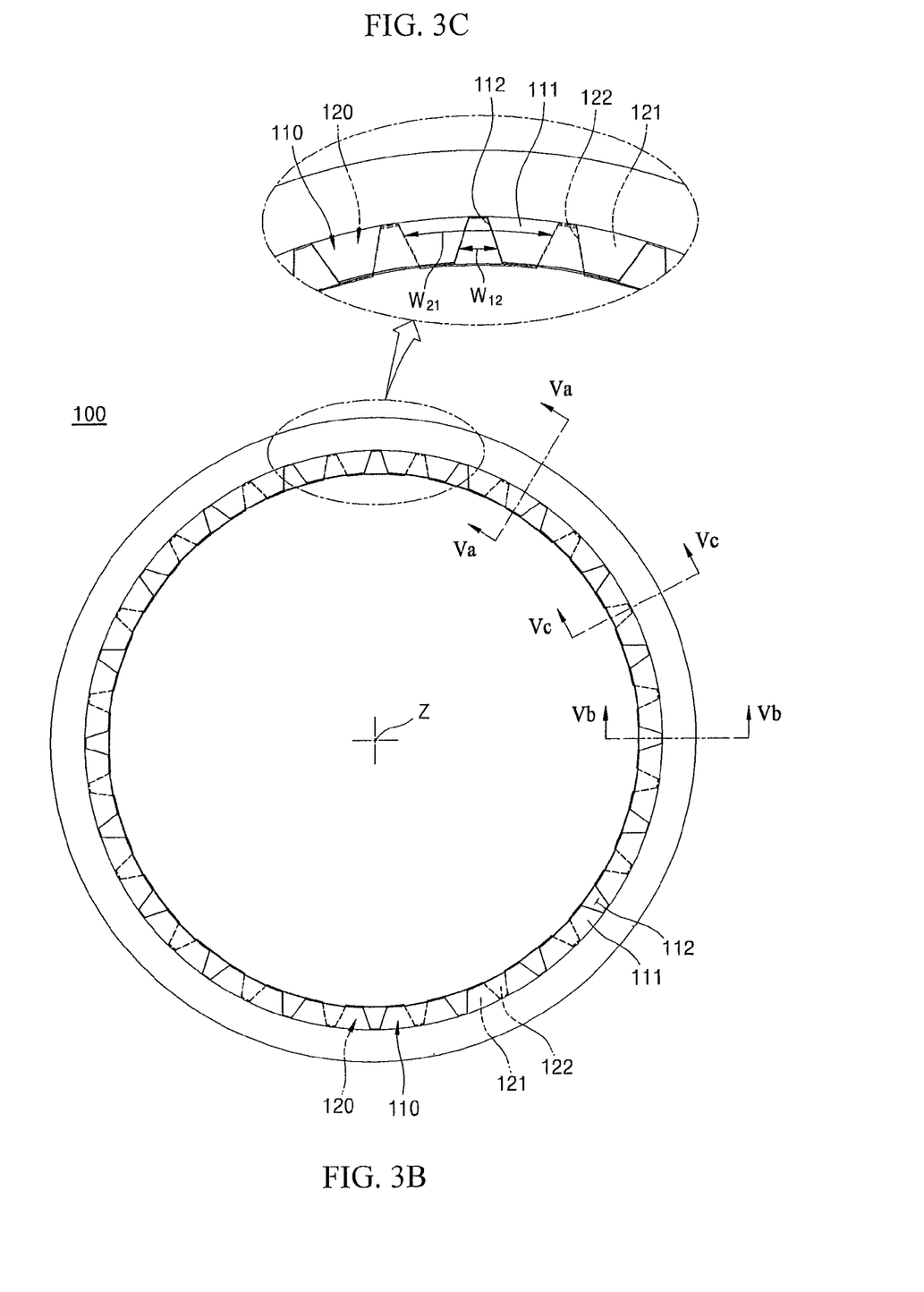
FIG. 3B is a plan view illustrating the lens spacer depicted in FIG. 1.
FIG. 3C is an enlarged view of the indicated area of FIG. 3B.

FIGS. 3A and 3B are, respectively, a perspective view and a plan view illustrating the lens spacer 100 depicted in FIG. 1. FIGS. 4A-4D are plan views illustrating a first film member 110 and a second film member 120 of the lens spacer 100 depicted in FIG. 3B.

Referring to FIGS. 3A-3C and 4A-4D, the lens spacer 100 of the present exemplary embodiment may include the first film member 110 and the second film member 120. The first film member 110 and the second film member 120 may be arranged along the optical axis Z.

The first film member 110 may have a ring shape, and may include: a plurality of first tabs 111 protruding from an inner circumferential surface of the first film member 110 toward the optical axis Z; and first recesses 112 between the first tabs 111.

Figure 4A:
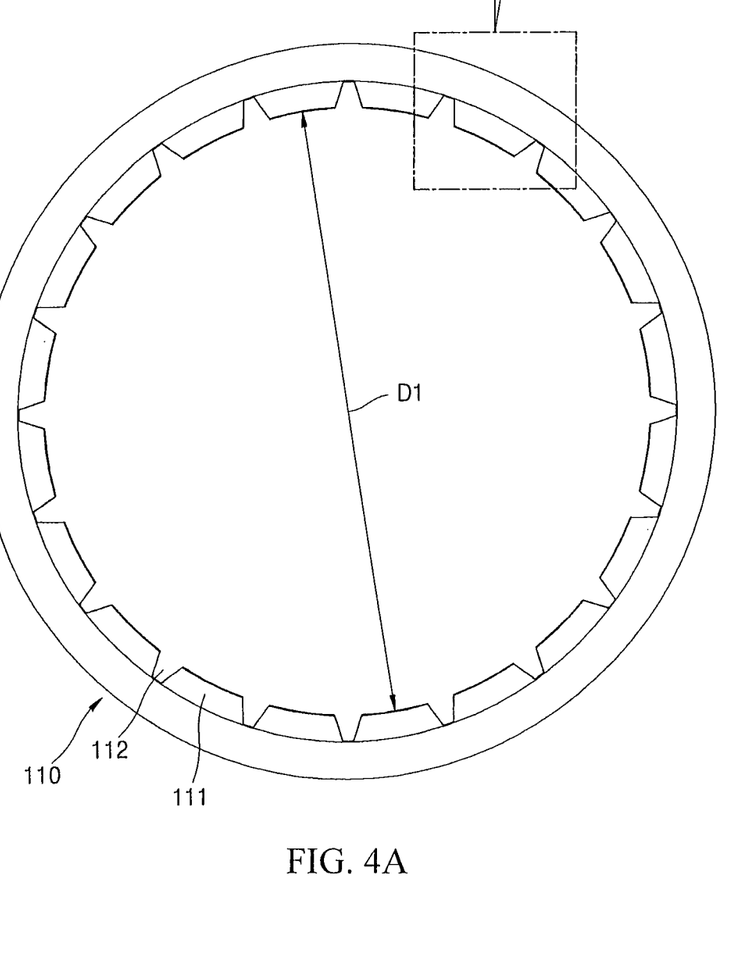
FIG. 4A is a plan view illustrating a first film member of the lens spacer depicted in FIG. 3B.
Figure 4B:
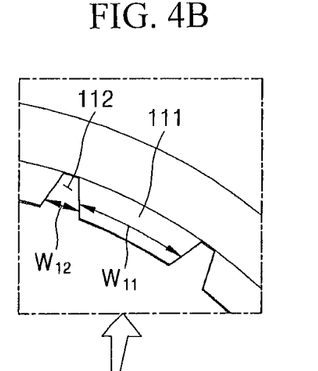
FIG. 4B is an enlarged view of the indicated area of FIG. 4A.
Figures 4C, 4D:
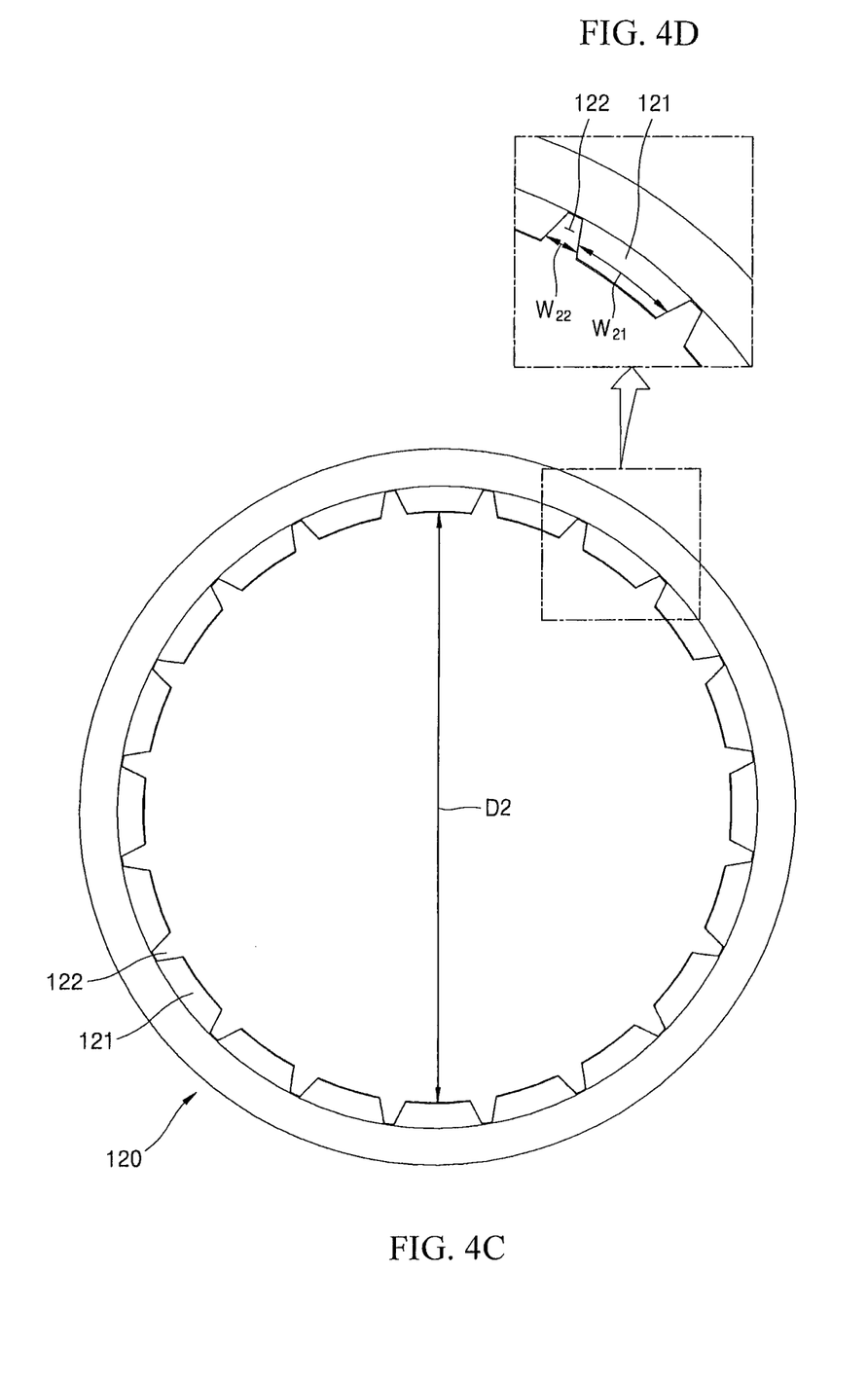
FIG. 4C is a plan view illustrating a second film member of the lens spacer depicted in FIG. 3B.
FIG. 4D is a large plan view illustrating a second film member of the lens spacer depicted in FIG. 3B.

The second film member 120 may have a ring shape. The second film member 120 may include: a plurality of second tabs 121 protruding from an inner circumferential surface of the second film member 120 toward the optical axis Z; and second recesses 122 between the second tabs 121.

The first and second film members 110 and 120 may be manufactured through a press forming process. For example, the first and second film members 110 and 120 may be manufactured by processing a flat sheet material through a press forming process. Examples of the flat sheet material include films formed of various materials. For example, the flat sheet material may be a polyethylene (PE) film or a polyethylene terephthalate (PET) film.

The first and second film members 110 and 120 may have a flat shape before the first and second film members 110 and 120 are brought into contact with at least one of the first and second lenses 10 and 20.

When the first and second film members 110 and 120 are disposed between the first and second lenses 10 and 20, the first and second film members 110 and 120 are brought into contact with at least one of the first and second lenses 10 and 20. The first tabs 111 of the first film member 110 and the second tabs 121 of the second film member 120 may be bent according to the shape of at least one of the first and second lenses 10 and 20. When the first tabs 111 and the second tabs 121 are bent, the distance between the first tabs 111 and the distance between the second tabs 121 are changed. That is, the circumferential width $W_{12}$ (FIG. 4A) of the first recesses 112 and the circumferential width $W_{22}$ (FIG. 4B) of the second recesses 122 are changed. Therefore, when the lens spacer 100 is disposed between the first and second lenses 10 and 20, the lens spacer 100 may not be wrinkled or otherwise bent.

The first and second film members 110 and 120 may be arranged such that the second tabs 121 of the second film member 120 may respectively overlap the first recesses 112 of the first film member 110.

The circumferential width $W_{21}$ of the second tabs 121 of the second film member 120 may be greater than the circumferential width $W_{12}$ of the first recesses 112. For example, the minimum of the circumferential width $W_{21}$ of the second tabs 121 may be greater than the maximum of the circumferential width $W_{21}$ of the first recesses 112.

The shape of the first tabs 111 is not limited to any particular shape and may include any suitable shape that would cover the second recesses 122. In addition, the shape of the second tabs 121 is not limited as long as the second tabs 121 cover the first recesses 112.

The second tabs 121 overlap portions of the first tabs 111 and the entire regions of the first recesses 112. The second tabs 121 may prevent light from passing through the first recesses 112.

The inner diameter D1 of the first film member 110 may be equal to the inner diameter D2 of the second film member 120. Herein, the inner diameter D1 of the first film member 110 is defined as the diameter of an imaginary circle connecting inner sides of the first tabs 111, and the inner diameter D2 of the second film member 120 is defined as the diameter of an imaginary circle connecting inner sides of the second tabs 121.

A closed loop may be formed by the first tabs 111 of the first film member 110 and the second tabs 121 of the second film member 120. For example, a closed loop may be formed by the respective inner sides of the first tabs 111 and the inner sides of the second tabs 121.

When only the first film member 110 is used, light may pass through the first recesses 112 such that the first recesses 112 may be viewed from the outside of the photographing apparatus 1. In this case, the aesthetic appearance of the photographing apparatus 1 may deteriorate. According to the present exemplary embodiment, however, the second tabs 121 of the second film member 120 may cover the first recesses 112 of the first film member 110 such that the aesthetic appearance of the photographing apparatus 1 may not be degraded by the first recesses 112. The first and second film members 110 and 120 may have the same shape.

When the first and second film members 110 and 120 have the same shape, for example, the circumferential width $W_{11}$ of the first tabs 111 of the first film member 110 may be equal to the circumferential width $W_{21}$ of the second tabs 121 of the second film member 120. In addition, the first and second film members 110 and 120 may have the same thickness. For example, the thickness of the first tabs 111 of the first film member 110 may be equal to the thickness of the second tabs 121 of the second film member 120.

Since the first and second film members 110 and 120 have the same shape as described above, the first and second film members 110 and 120 may be manufactured using the same die. Therefore, the lens spacer 100 may be manufactured at a relatively low cost and may involve a relatively fewer number of processes.

The circumferential width $W_{11}$ of the first tabs 111 may be greater than the circumferential width $W_{12}$ of the first recesses 112. The circumferential width $W_{21}$ of the second tabs 121 may be greater than the circumferential width $W_{22}$ of the second recesses 122. Since the circumferential widths $W_{11}$ and $W_{21}$ of the first and second tabs 111 and 121 are greater than the circumferential width $W_{12}$ and $W_{22}$ of the first and second recesses 112 and 122, the first and second recesses 112 and 122 may easily be covered with the first and second tabs 111 and 121.

Figure 5A:
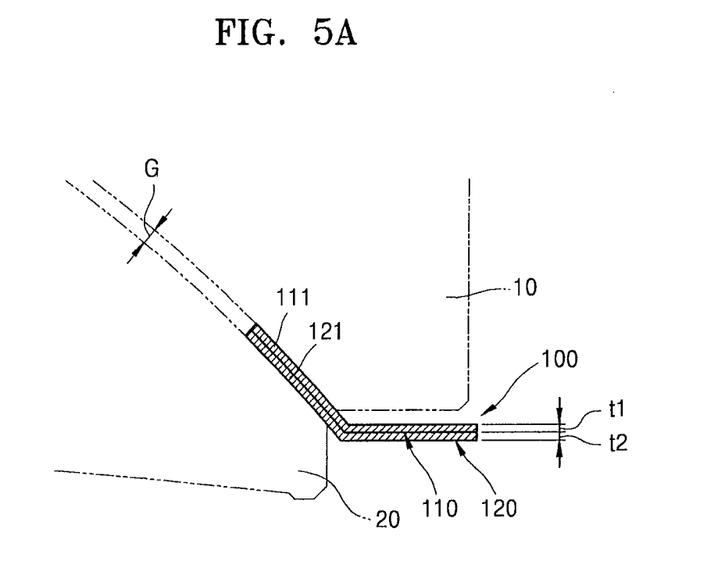
FIG. 5A is a cross-sectional view of the lens spacer taken along a line Va-Va of FIG. 3B.
Figure 5B:
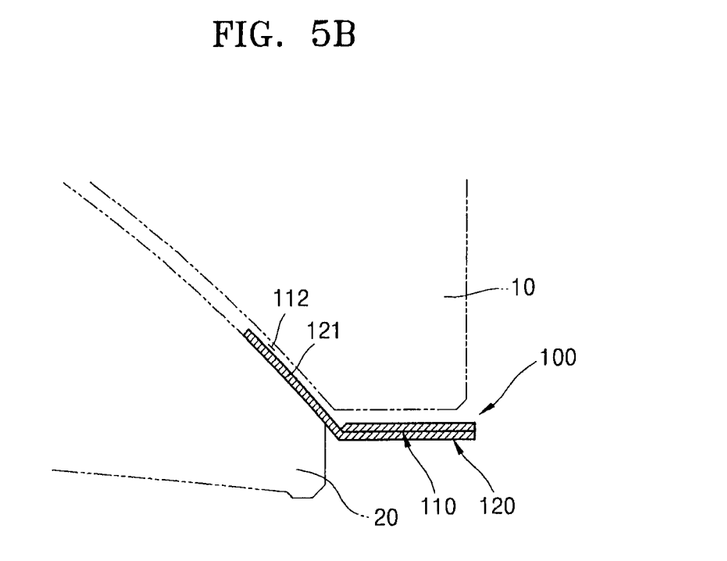
FIG. 5B is a cross-sectional view of the lens spacer taken along a line Vb-Vb of FIG. 3B.
Figure 5C:
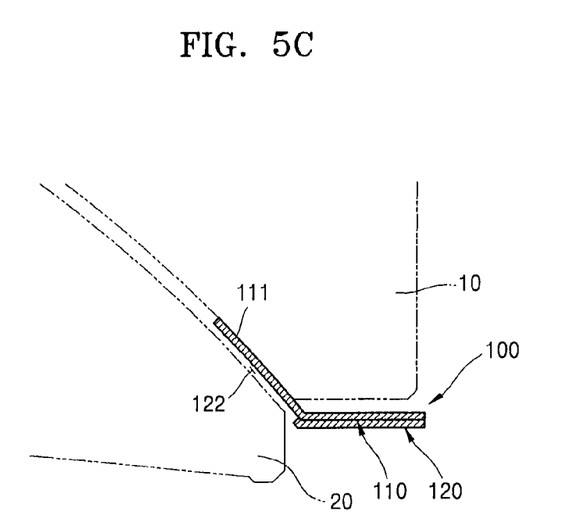
FIG. 5C is a cross-sectional view of the lens spacer taken along a line Vc-Vc of FIG. 3B.

FIG. 5A is a cross-sectional view of the lens spacer 100 taken along a line Va-Va of FIGS. 3B-3C, FIG. 5B is a cross-sectional view of the lens spacer 100 taken along a line Vb-Vb of FIGS. 3B-3C, and FIG. 5C is a cross-sectional view of the lens spacer 100 taken along a line Vc-Vc of FIGS. 3B-3C. The cross-sectional structure of the lens spacer 100 of the present exemplary embodiment will now be described with reference to FIGS. 3B-3C and FIGS. 5A to 5C.

In the lens spacer 100 of the present exemplary embodiment, portions of the second tabs 121 may overlap the first tabs 111 while other portions of the second tabs 121 may overlap the first recesses 112. In addition, portions of the first tabs 111 may overlap the second tabs 121 while other portions of the first tabs 111 may overlap the second recesses 122.

Referring to FIG. 5A, portions of the first tabs 111 may overlap portions of the second tabs 121. Upper surfaces of the first tabs 111 may be in contact with the lower surface of the first lens 10, and lower surfaces of the second tabs 121 may be in contact with the upper surface of the second lens 20. In this case, the thickness of the lens spacer 100 may be disposed between the first and second lenses 10 and 20 and may be equal to the sum of the thickness t1 of the first tabs 111 and the thickness t2 of the second tabs 121. The sum of the thickness t1 of the first tabs 111 and the thickness t2 of the second tabs 121 may be within the range of about 0.03 mm to about 1.0 mm. The gap G between the first and second lenses 10 and 20 may be maintained owing to regions in which the first tabs 111 and the second tabs 121 overlap each other.

Referring to FIGS. 5B and 5C, portions of the second tabs 121 may overlap the first recesses 112, and portions of the first tabs 111 may overlap the second recesses 122. In this case, the thickness of the lens spacer 100 disposed between the first and second lenses 10 and 20 may be equal to the thickness t1 of the first tabs 111 or the thickness t2 of the second tabs 121. Since the thickness of the lens spacer 100 may be disposed between the first and second lenses 10 and 20 is locally decreased, any scattering of light that may be caused by an inner side of the lens spacer 100 may be reduced.

As described above, according to the exemplary embodiment, the gap G between the first and second lenses 10 and 20 may be maintained owing to the regions in which the first and second tabs 111 and 121 of the lens spacer 100 overlap each other, and scattering of light caused by the inner side of the lens spacer 100 may be reduced owing to regions in which the first and second tabs 111 and 121 do not overlap each other.

In the above-described exemplary embodiment, the lens spacer 100 may include the two film members 110 and 120 that overlap each other. However, the inventive concept is not limited thereto. For example, the lens spacer 100 may include three or more film members overlapping each other.

As described above, the lens spacer 100 and the photographing apparatus 1 including the lens spacer 100 may be manufactured simply and easily at a relatively low cost while precisely maintaining a gap between lenses having curved surfaces and improving the aesthetic appearance of the photographing apparatus 1.

Reference numerals are used in the accompanying drawings to provide clear understanding of the exemplary embodiments, and terms used in the descriptions of the embodiments should not be construed as being limited to general meanings or dictionary definitions but should be construed as including all elements that those of ordinary skill in the related art may associate with the terms.

Terms such as "mechanism," "element," "means," or "configuration" may be widely used and are not limited to mechanical and physical configurations. Such terms may have the meaning of a series of routines of software in association with a processor or the like.

In addition, the above-described operations or embodiments are examples which are not intended to limit the scope and spirit of the inventive concept. In the present disclosure, descriptions of known electric components, control systems, software, and other functional aspects thereof may not given for conciseness. Furthermore, in the drawings, connection lines or members between elements are exemplary functional, physical, and/or electric connections that can be replaced with or used together with other functional, physical, and/or electrical connections. Elements described without using terms such as "essential" and "important" may not be necessary for constituting the inventive concept. In the present disclosure, terms such as "comprising" and "including" should be construed as open-ended terms that do not exclude the presence or addition of one or more other elements.

The singular forms "a," "an" and "the" in this present disclosure, in particular, claims, may be intended to include the plural forms as well. Unless otherwise defined, the ranges defined herein are intended to include any embodiment to which values within the range are individually applied and may be considered to be the same as individual values constituting the range in the detailed description. Finally, operations constituting a method may be performed in appropriate order unless explicitly described in terms of order or described to the contrary. The inventive concept is not necessarily limited to the order of operations given in the description. The examples or exemplary terms (for example, etc.) used herein are to merely describe exemplary embodiments in detail and not intended to limit the inventive concept unless defined by the following claims. Furthermore, it will be understood by those of ordinary skill in the art that various changes in form and details may be made within the embodiments without departing from the spirit and scope of the inventive concept.

What is claimed is:

1. A lens spacer configured to maintain a gap between a first lens and a second lens arranged along an optical axis, comprising:
    a first film member having a ring shape, the first film member comprising a plurality of first tabs and a plurality of first recesses disposed between adjacent ones of the first tabs, the first tabs protruding from an inner circumferential surface of the first film member toward the optical axis; and
    a second film member having a ring shape, the second film member comprising a plurality of second tabs and a plurality of second recesses disposed between adjacent ones of the second tabs, the second tabs protruding from an inner circumferential surface of the second film member toward the optical axis,
    wherein the first and second film members are arranged along the optical axis and the second tabs overlap respective ones of the first recesses.

2. The lens spacer of claim 1, wherein each of the second tabs has a circumferential width that is greater than a circumferential width of that of respective ones of the first recesses that the second tabs overlap.

3. The lens spacer of claim 2, wherein the second tabs overlap portions of the first tabs and the circumferential width of the first recesses in their entireties.

4. The lens spacer of claim 1, wherein each of the second tabs has a circumferential width that is greater than a circumferential width of the second recesses.

5. The lens spacer of claim 1, wherein the first and second film members have a substantially similar shape.

6. The lens spacer of claim 5, wherein the first tabs have a circumferential width equal to a circumferential width of the second tabs.

7. The lens spacer of claim 5, wherein the first and second film members have an equal thickness.

8. The lens spacer of claim 1, wherein each of the first and second film members has an inner diameter that are equal to each other.

9. The lens spacer of claim 8, wherein the first and second tabs form a closed loop.

10. The lens spacer of claim 1, wherein a sum of a thickness of the first tabs and a thickness of the second tabs ranges from about 0.03 mm to about 1.0 mm.

11. A photographing apparatus comprising:
    a first lens and a second lens arranged along an optical axis; and
    a lens spacer disposed between the first and second lenses, the lens spacer being configured to maintain a gap between the first and second lenses,
    wherein the lens spacer comprises:
    a first film member having a ring shape, the first film member comprising a plurality of first tabs and a plurality of first recesses disposed between adjacent ones of the first tabs, the first tabs protruding from an inner circumferential surface of the first film member toward the optical axis; and
    a second film member having a ring shape, the second film member comprising a plurality of second tabs and a plurality of second recesses between the second tabs, the second tabs protruding from an inner circumferential surface of the second film member toward the optical axis,
    wherein the first and second film members are arranged along the optical axis, and the second tabs overlap respective ones of the first recesses.

12. The photographing apparatus of claim 11, wherein the second tabs have a circumferential width greater than a circumferential width of the first recesses.

13. The photographing apparatus of claim 12, wherein the second tabs overlap portions of the first tabs and the circumferential width of the first recesses in their entireties.

14. The photographing apparatus of claim 11, wherein the second tabs have a circumferential width greater than a circumferential width of the second recesses.

15. The photographing apparatus of claim 11, wherein the first and second film members have a same shape.

16. The photographing apparatus of claim 15, wherein the first tabs have a circumferential width equal to a circumferential width of the second tabs.

17. The photographing apparatus of claim 15, wherein the first and second film members each have a thickness that are equal.

18. The photographing apparatus of claim 11, wherein the first and second film members each have an inner diameter that are equal.

19. The photographing apparatus of claim 18, wherein the first and second tabs form a closed loop.

20. The photographing apparatus of claim 11, wherein a sum of a thickness of the first tabs and a thickness of the second tabs ranges from about 0.03 mm to about 1.0 mm.

* * * * *